Nov. 4, 1958 — R. L. SMIRL ET AL — 2,858,681
DRIVE MECHANISMS
Filed May 20, 1955 — 2 Sheets-Sheet 1
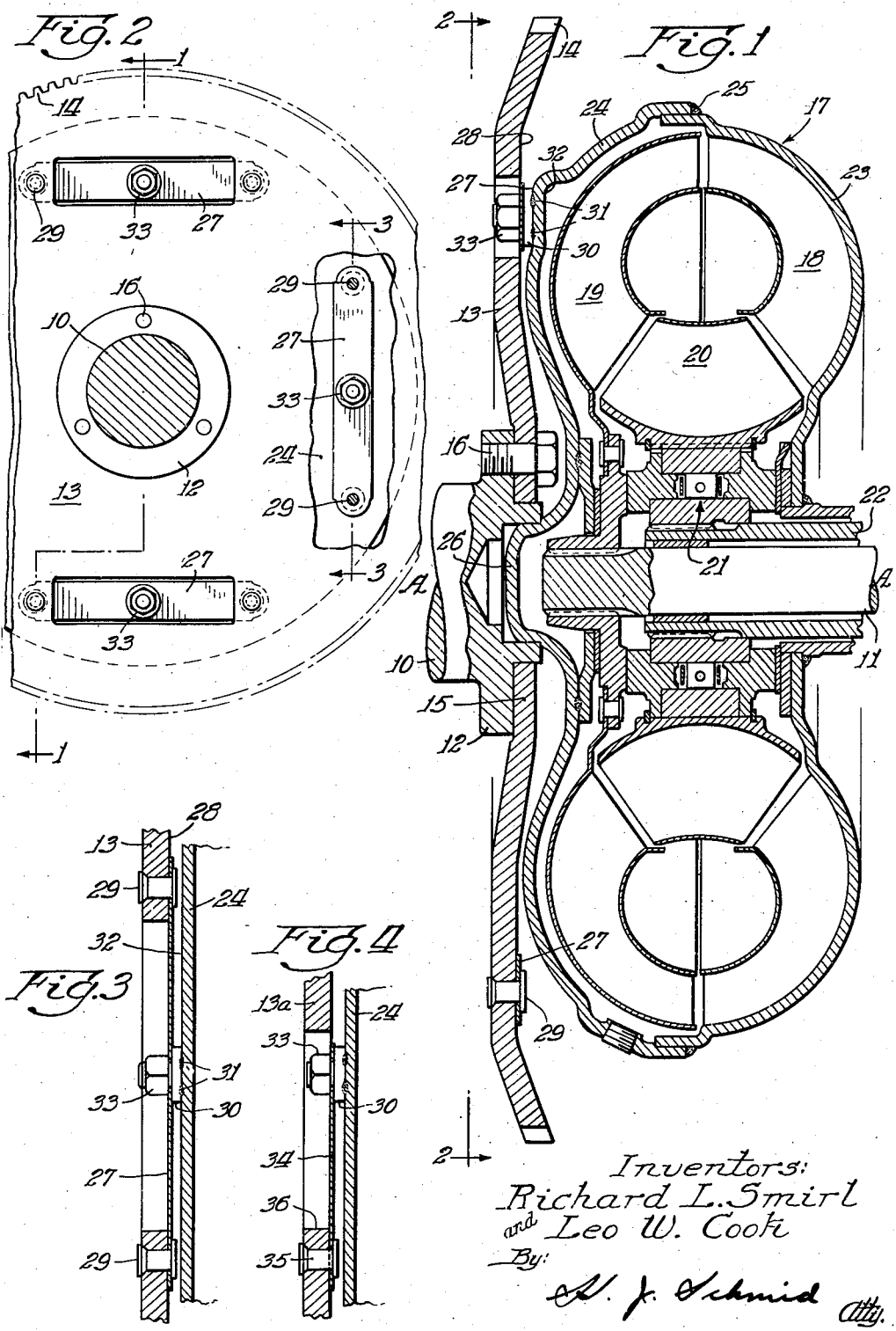
Inventors:
Richard L. Smirl
and Leo W. Cook

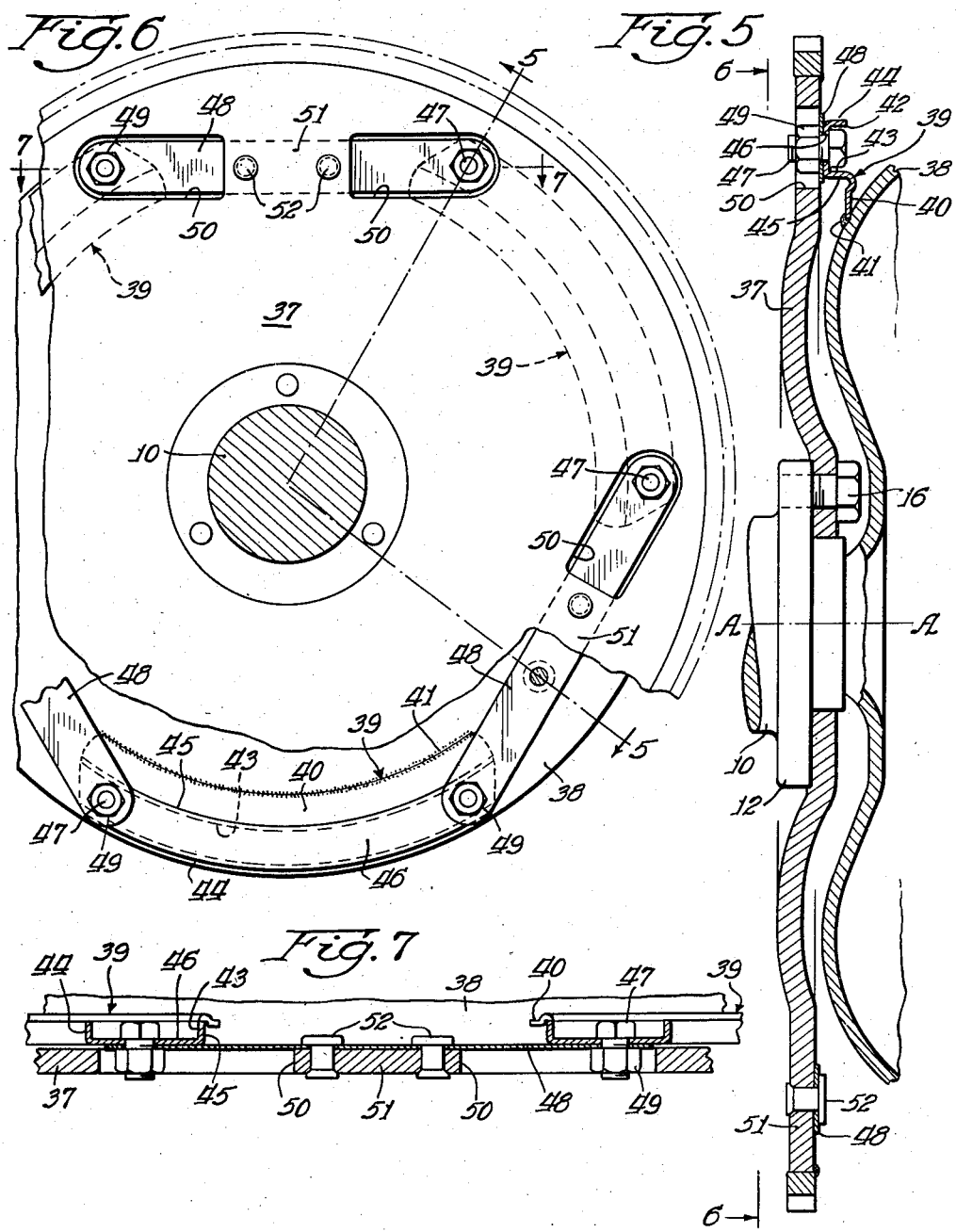

United States Patent Office 2,858,681
Patented Nov. 4, 1958

2,858,681

DRIVE MECHANISMS

Richard L. Smirl, La Grange Park, and Leo W. Cook, Chicago, Ill., assignors to Borg-Warner Corporation, Chicago, Ill., a corporation of Illinois Application May 20, 1955, Serial No. 509,932

23 Claims. (Cl. 64—15)

This invention relates to drive mechanisms and more particularly to improved arrangements for flexibly connecting driving and driven members of such mechanisms.

Another object of the invention is to provide improved arrangements for flexibly connecting drive and driven members for conjoint rotation while accommodating any axial misalignment of the members and preventing or resisting relative axial movement of the members.

Another object of the invention is to provide improved arrangements for flexibly connecting drive and driven plates and including flexible metallic links or straps arranged in chordal positions with respect to a circumference of the axis of rotation and connected to the plates to provide a flexible drive.

Another object of the invention is to provide improved arrangements for flexibly connecting drive and driven plates and including flat flexible metallic links or straps each having its ends connected to one of said plates and an intermediate portion connected to the other of said plates for the transmission of drive directly from the drive plate to the driven plate in a straight line coinciding with the major axis of the link and for preventing or resisting relative axial movement of the plates.

Another object of the invention is to provide improved arrangements for flexibly connecting drive and driven plates and including flexible metal links or straps disposed between and engaging the plates and secured to one plate, and the other plate having securing members fixed thereon and connected to the straps, the securing members extending within openings in the first-mentioned plate to provide for axial compactness of the assembly.

A specific object of the invention is to provide improved arrangements for flexibly connecting a flywheel plate, and a drive plate forming a portion of a fluid-containing housing of a hydrodynamic coupling device, and including flat flexible metal links or straps disposed in chordal positions with respect to a circumference of the axis of rotation and engaging a side of the flywheel plate and having ends secured thereto and to securing members fixed to the drive plate and extending into openings in the flywheel plate, each link functioning to transmit drive directly from the flywheel plate to the drive plate in a straight line coinciding with the major axis of the link and accommodating axial misalignment of the plates while preventing or restricting relative axial movement of the plates.

Further objects and advantages of the invention will become apparent from the following detailed illustrative embodiments of the principles of the invention, reference being had to the accompanying drawings in which:

Fig. 1 is a sectional view of a drive mechanism in accordance with the invention, the section being taken substantially on line 1—1 of Fig. 2;

Fig. 2 is a partial elevational view taken on line 2—2 of Fig. 1, certain portions of the drive mechanism being broken away to more clearly illustrate details of construction;

Fig. 3 is a sectional view taken as indicated by the line 3—3 of Fig. 2;

Fig. 4 is a sectional view, similar to Fig. 3, showing another arrangement for flexibly connecting drive and driven members of a drive mechanism;

Fig. 5 is a fragmentary sectional view of a drive mechanism illustrating still another arrangement for connecting drive and driven members of the mechanism, said section being taken on line 5—5 of Fig. 6;

Fig. 6 is an elevational view of the structure shown in Fig. 5 and taken on line 6—6 of Fig. 5, certain portions of the drive mechanism being broken away to more clearly illustrate the invention;

Fig. 7 is a sectional view taken on the line 7—7 of Fig. 6.

As an example of one form in which the invention may be embodied, there is shown in the drawings a drive mechanism of the type suitable for embodiment in a motor vehicle and adapted to be disposed between an engine crankshaft 10 and a transmission input shaft 11, preferably, but not necessarily, connected to change speed gearing of a transmission.

The drive mechanism illustrated in Figs. 1, 2 and 3 comprises the engine crankshaft 10 and the transmission input shaft 11, the engine crankshaft 10 having a radially extending flange 12 to which is secured a rigid steel flywheel plate 13 having ring gear teeth 14 on its outer periphery adapted to mesh with a gear associated with the usual engine starting equipment of the vehicle. As shown in Fig. 1 the flywheel plate 13 is of annular form, having a central opening receiving an axially projecting flange 15 on the engine crankshaft 10 for supporting the flywheel, an inner peripheral portion of the flywheel 13 engaging the radially extending flange 12 of the engine crankshaft and being bolted thereto by bolts 16 extending through circumferentially spaced openings in the flywheel and the flange 12 of the crankshaft 10, the bolts having threaded engagement with the flange 12 as shown.

The drive mechanism further comprises a hydrodynamic coupling device in the form of a hydraulic torque converter generally indicated at 17 and comprising an impeller 18, a turbine 19, and a stator or reaction member 20, each of these elements of the torque converter having curved vanes providing for the toroidal circulation of fluid in the torque converter, the stator 20 having associated therewith a one-way brake 21 disposed between the stator and a stationary sleeve 22 of a transmission casing for holding the stator 20 against rotation for the purpose of torque multiplication and releasing the stator 20 upon the impeller and turbine attaining their coupling point at a substantially 1:1 speed ratio. The operation of the hydraulic torque converter is well known in the art and no further description therefore is deemed necessary.

The hydraulic torque converter comprises a fluid housing for containing the fluid in the torque converter, the housing comprising a substantially semi-toroidal shell 23 of the impeller 18 and a substantially semi-toroidal drive plate 24, the drive plate 24 and the impeller shell 23 having overlapping flanges at their radially outer peripheries in telescoping relation and connected to each other by a continuous weld 25 extending circumferentially of the shell 23 to connect the drive plate 24 and the impeller shell 23 for conjoint rotation about the axis A—A of the drive mechanism while preventing the escape of fluid between the telescoped flanges of the drive plate 24 and the impeller shell 23. It will be apparent that rotation of the drive plate 24 will cause the impeller 18 to be rotated to circulate the fluid in the torque converter to drive the turbine 19 having a splined connection to the transmission input shaft 11 for driving the shaft 11. The drive plate 24 of the torque converter has an axially extending hub 26 received within the opening in the end of the crankshaft 10, defined by the annular flange 15 thereof, for piloting the drive plate 24 in the engine crankshaft.

The present invention is directed to the provision of flexibly connecting the flywheel or drive plate 13 to a driven plate, which, in the present embodiment, constitutes the drive plate 24 of the hydraulic torque converter, for conjoint rotation of the drive and driven plates while accommodating any axial misalignment of the plates and preventing or resisting relative axial movement of the plates. Figs. 1, 2 and 3 illustrate an improved arrangement for flexibly connecting the flywheel plate 13 to the plate 24 and comprises a plurality of flexible driving links or straps in the form of flat strips, preferably of spring steel, indicated at 27. Each of the flat straps 27 engage a flat side surface 28 of the flywheel plate 13 and is disposed in a radial plane parallel to the radial plane of the engaged surface of the flywheel plate 13. The ends of the straps 27 are secured to the flywheel plate by a plurality of rivets 29, each rivet extending through aligned openings in the strap 27 and flywheel plate 13 and having heads at opposite ends thereof for securely connecting the strap to the flywheel. As shown in Figs. 2 and 3, the strap 27 has its opposite ends connected to the flywheel plate 13 by the rivets 29, so that the strap 27 lies flush with the surface 28 of the flywheel plate. Each strap 27 is connected to the plate 24 by a securing member or stud 30 welded as at 31, to a radially extending flat portion 32 of the drive plate 24, the stud 30 extending through an opening in a central portion of the strap 27 intermediate the ends thereof and being secured to the strap 27 by a nut 33 threaded on the stud 30 to secure the strap to the drive plate 24. It will be seen from inspection of Figs. 1, 2 and 3 that the flywheel plate 13 is provided with a plurality of elongate openings for receiving the studs 30 and nuts 33 which is of considerable advantage for providing for the axial compactness of the drive mechanism. It will be noted that, by positioning the straps 27 chordally with respect to a circumference of the axis of rotation and by securing the straps directly to the flywheel plate 13 and the drive plate 24, respectively, each drive link is adapted to carry a maximum torque load without breakage thereof, the torque load being transferred directly from the flywheel plate 13 to the drive plate 24 in a straight line coinciding with the major axis of the driving link. Also, this arrangement, and particularly the provision of providing openings in the flywheel plate 13 to accommodate the studs 30 on the drive plate 24, permits the strap to remain flat and be disposed in a radial plane for maximum torque transmitting ability, while permitting the straps to yield sufficiently to accommodate a slight axial misalignment of the crankshaft 10 and the input shaft 11, in the assembly of the drive mechanism with the engine crankshaft and the transmission input shaft.

A further advantage of the arrangement described is that the straps 27 are connected at their opposite ends to the flywheel plate and at their intermediate portions to the drive plate 24 to securely hold the drive plate 24 from moving axially of the flywheel plate 13 inasmuch as the rivets 29 at opposite ends of each link or strap prevents or restricts axial movement of the flywheel plate 13 and drive plate 24 relative to each other, while permitting bending of the straps sufficiently to an extent to accommodate any axial misalignment between the crankshaft 10 and the transmission input shaft 11; this connection of these straps, as described, also preventing any possibility of swivelling action between the flywheel plate 13 and the drive plate 24 during the transmission of torque from the flywheel plate 13 to the impeller 18.

Fig. 4 illustrates a modified arrangement of the flexible connection between a flywheel plate 13a and a drive plate 24, in which a plurality of thin flat links or straps 34, preferably formed of spring steel, are disposed between the flywheel plate and the drive plate, with each of the straps having its opposite ends respectively connected to the flywheel plate by a rivet 35 and to the stud 30 on the drive plate 24 by the nut 33. These straps are also positioned chordally with respect to a circumference of the axis of rotation, the straps 34 lying in a radial plane parallel to the adjacent radially extending portions of the flywheel plate and the drive plate. In this modified arrangement, the positioning of the straps 34 allows them to carry a maximum torque load without breakage with the load being transferred direcly from the flywheel plate to the drive plate in a straight line coinciding with the major axis of the driving strap. It may be noted that the connection of the opposite ends of the drive strap 34 to the flywheel plate and the drive plate accommodates slight axial misalignment of the crankshaft 10 and the drive shaft 11, while permitting a swivelling action of the plate 13a with respect to the plate 24, or vice versa, which may be desirable in certain installations. The flywheel plate is provided with a plurality of elongate openings 36 for receiving the stud 30 on the plate 24 to provide maximum axial compactness of the drive mechanism.

Figs. 5, 6 and 7 illustrate a further modified flexible connection between a rigid flywheel plate 37, and a drive plate 38 forming a portion of a fluid-containing housing of a hydrodynamic coupling device such as illustrated in Fig. 1. More particularly, the drive plate 38 is of substantially semi-toroidal form as shown in Fig. 5 and has connected to the outer surface thereof a plurality of arcuately shaped connecting members 39 disposed equidistantly from the axis A—A on a circumference of the axis to form segments of a circle. Each member 39 has a radially extending portion 40 with its radially inner edge engaged with the outer surface of the plate 38 and conforming to the curvature of the surface and welded thereto by a weld 41. Each connecting member 39 also has a channel portion 42 defining an arcuate groove 43 with the radially outer and inner walls 44 and 45 extending in an axial direction and a connecting radially extending portion or wall 46, the radially extending portion 46 being axially spaced from the radially extending portion 41 of the member as shown in Fig. 5. The wall 46 of each member 39, defining the bottom of the groove 43 therein, is provided with a plurality of openings or holes at opposite ends thereof and disposed on a circumference of the axis A—A and through which extend a pair of bolts 47, received within openings in opposite ends of the flexible flat drive straps or links 48. The straps are secured to the bolts by nuts 49, the bolts extending within, and the nuts being disposed in, circumferentially spaced elongate openings or slots 50 in the flywheel 37, as shown in Figs. 5 and 7. Intermediate portions of these straps are secured to portions 51 of the flywheel plate 37, defining adjacent ends of the elongate slots 50, by a plurality of rivets 52. It will be seen from an inspection of Figs. 5 and 7 that the metal straps remain flat in their assembly with the flywheel plate 37 and the drive plate 38, the straps lying in a radial plane parallel to the planes of the radially extending portion of the flywheel plate and the radially extending walls 46 of the mounting members 39. Furthermore, the straps are positioned chordally with respect to a circumference of the axis of rotation and, as they are secured directly to the flywheel 37 and the drive plate 38, respectively, the straps will drivingly connect the plates while transferring a maximum torque load in a straight line coinciding with the major axis of each driving strap, while preventing or restricting relative axial movement of the drive plate 38 and the flywheel 37 and permitting slight movement thereof to accommodate axial misalignment of the crankshaft 10 and the transmission input shaft. Furthermore, as the bolts 47 extend within openings in the flywheel plate 37, maximum axial compactness of the drive mechanism is insured. As the mounting members 39 are disposed in a radial plane intersecting the drive plate 38, there is no interference with the objective of attaining maximum axial compactness of the drive mechanism. As the mounting members 39 are directly welded to the drive plate 38, they may be considered an integral portion of the plate.

It will be noted that, in the arrangements shown in the drawings, the straps are positioned and secured to the flywheel plate and the drive plate by rivets lying on a circumference of the axis of rotation and by bolts or studs lying on a different circumference of the axis of rotation, and, as the openings in each strap is on the major axis of the strap, the straps are necessarily positioned chordally of a circumference of the axis of rotation.

An advantageous feature of the invention and embodied in each of the described and illustrated flexible driving arrangements is the provision of the elongate openings or slots in the flywheel plate which allows sufficient room for the drive links or straps to flex and move about in the openings to accommodate axial misalignment and restricted relative axial movement of the flywheel and torque converter without the necessity for offsetting the straps from the flywheel plate and drive plate of the torque converter by bosses, or like projecting portions on one or both plates to allow movement of the straps for the purpose described. A further advantageous feature of the elongate openings or slots in the flywheel plate is the ability of utilizing these slots to receive the studs or bolts on the drive plate of the torque converter drive plate for axial compactness and to permit accessibility of the bolts or studs to receive the nuts which may be readily engaged with or disengaged from the bolts and studs in the assembly or disassembly of the plates.

While there has been shown and described certain embodiments of structure to illustrate the principles of the invention, it is to be understood that the invention is not to be limited to the specific details shown and described above, as it will be apparent that various modifications and changes may be made utilizing the teachings of the invention as set forth in the appended claims, and it is not therefore the intention to limit the invention to the particular details of construction and operation shown and described for illustrative purposes.

We claim:

1. In a drive mechanism, rotatable first and second plates, said first plate having elongate openings extending therethrough; and flexible drive links between said plates and adjacent said openings and connected to said first plate and to said second plate, said links and said elongate openings in said first plate being disposed chordally to a circumference of rotation of one of said plates and said openings having a greater width than said links to permit flexing movement of portions of said links into said openings during movement of said plates to accommodate axial misalignment of said members.

2. In a drive mechanism, spaced first and second members, each having an axis of rotation and extending radially thereof, said first member having elongate openings therein; securing means on said second member extending into said openings and spaced from the margins of said openings; and flexible drive links between said members, and adjacent said openings, and connected to said first member and to the securing means on said second member, each adjacent link and elongate openings in said first member extending parallel to each other and said opening having a greater width than said link to permit flexing movement of portions of said link into said opening during movement of said members to accommodate axial misalignment of said members.

3. In a drive mechanism, rotatable first and second plates, said first plate having elongate openings therein; securing means on said second plate extending into said openings and spaced from the margins of said openings; and flat flexible drive links between said plates and adjacent said openings and connected to said first plate and to the securing means on said second plate for drivingly connecting said plates, each adjacent link and elongate opening in said first plate extending parallel to each other and said opening having a greater width than said link to permit flexing movement of portions of said links into said opening during movement of said plates to accommodate axial misalignment of said plates.

4. In a drive mechanism, spaced first and second members, each having an axis of rotation and extending radially thereof, said first member having elongate openings therein; securing means on said second member extending into said openings and spaced from the margins of said openings; and flexible drive links between said members, and adjacent said openings, and connected to said first member and to the securing means on said second member, each adjacent link and elongate opening in said first member extending parallel to each other and chordally to a circumference of the axis of rotation of one of said members and said opening having a greater width than said link to permit flexing movement of portions of said link to permit flexing movement of portions of said link into said opening during movement of said members to accommodate axial misalignment of said members.

5. In a drive mechanism, rotatable first and second plates having radially spaced adjacent flat portions, said first plate having elongate openings in said flat portion thereof; securing members on said flat portion of said second plate extending into said openings and spaced from the margins of said openings; and flat flexible drive links between said plates, adjacent said openings and connected to the flat portion of said first plate and to the securing members on said second plate, each adjacent link and opening in said first plate extending parallel to each other and said opening having a greater width than said link to permit flexing movement of portions of said link into said opening during movement of said plates to accommodate axial misalignment of said plates.

6. In a drive mechanism, a flywheel plate having circumferentially spaced elongate openings therethrough; a hydrodynamic coupling device having a fluid-containing housing including a drive plate disposed adjacent said flywheel plate; and flexible drive links between said plates and adjacent said openings connected to flywheel plate and to said drive plate, each link and opening in said flywheel plate extending parallel to each other and being arranged chordally of a circumference of the axis of rotation of said flywheel plate and said opening being of greater width than said link to permit flexible movement of portions of said link into said opening during movement of said plates.

7. In a drive mechanism, a flywheel plate having circumferentially spaced elongate openings therethrough; a hydrodynamic coupling device having a fluid-containing housing including a drive plate disposed adjacent said flywheel plate; securing means on said drive plate and extending into said openings and spaced from the margins of said openings; and flexible drive links between said plates and adjacent said openings and connected to said flywheel plate and to the securing means on said drive plate, each adjacent link and opening in said flywheel plate extending parallel to each other and said opening being of greater width than said link to permit flexing movement of portions of said link into said opening during movement of said plates.

8. In a drive mechanism, a flywheel plate having a flat portion provided with circumferentially spaced elongate openings therethrough; a hydrodynamic coupling device having a fluid-containing housing including a drive plate having a flat portion disposed adjacent said flywheel plate; securing means on said flat portion of said drive plate and extending into said openings and spaced from the margins of said openings; and flat flexible drive links between said plates and adjacent said openings, each link being connected along its major axis to said flywheel plate and to the securing means on said drive plate, each adjacent link and opening in said flywheel plate extending parallel to each other and being arranged chordally of a circumference of the axis of rotation of said flywheel plate and said opening being of greater width than said link to permit flexing movement of portions of said link into said opening during movement of said plates to accommodate axial misalignment of said plates.

9. In a drive mechanism, spaced first and second members, each having an axis of rotation and extending radially thereof, said first member having elongate openings therein; flexible drive links between said members and each link having its ends connected to said first member and having an intermediate portion connected to said second member, said links and said elongate openings being disposed adjacent each other, each adjacent link and opening in said first member extending parallel to each other and said opening having a greater width than said link to permit flexible movement of portions of said link into said opening during movement of said members to accommodate axial misalignment of said members.

10. In a drive mechanism, rotatable first and second plates, said first plate having elongate openings extending therethrough; and flexible drive links between said plates and each link having its ends connected to said first plate and having an intermediate portion connected to said second plate, said links and said elongate openings being disposed adjacent each other and each adjacent link and opening in said first plate extending parallel to each other and being arranged chordally of a circumference of the axis of rotation of one of said plates and said opening having a greater width than said link to permit flexing movement of portions of said link into said opening during movement of said plates to accommodate axial misalignment of said plates.

11. In a drive mechanism, spaced first and second members, each member having an axis of rotation and extending radially thereof, said first member having elongate openings therein; securing means on said second member extending into said openings and spaced from the margins of said openings; and flexible drive links between said members and adjacent said openings, each link having its opposite ends connected to said first member and having an intermediate portion connected to the securing means on said second member, each adjacent link and opening in said first member extending parallel to each other and said opening having a greater width than said link to permit flexing movement of portions of said link into said opening during movement of said members to accommodate axial misalignment of said members.

12. In a drive mechanism, a flywheel plate; a hydrodynamic coupling device having a fluid-containing housing including a drive plate disposed adjacent said flywheel plate, one of said plates having circumferentially spaced elongate openings therein; securing means on the other of said plates and extending into said openings and spaced from the margins of said openings; and flat flexible drive links between said plates and each link having its ends connected to said one plate and having an intermediate portion connected to said securing means, said link being arranged chordally of a circumference of the axis of rotation of said one plate.

13. In a drive mechanism as defined in claim 12 wherein the connections of each link to said securing means and said one plate are on the major axis of said link.

14. In a drive mechanism, a flywheel plate having circumferentially spaced openings therein; a hydrodynamic coupling device having a fluid-containing housing including a drive plate disposed adjacent said flywheel plate; a plurality of axially extending threaded studs spaced circumferentially of said drive plate and welded to said drive plate, said studs extending into said openings and being spaced from the margins of the openings; and flat flexible drive links between said plates and overlying said openings and each link having its opposite ends connected to said flywheel plate, and having intermediate portions having openings receiving said studs; nuts threaded on to said studs, said links being arranged chordally of a circumference of the axis of rotation and each link being connected to said flywheel plate and to said studs on the major axis of the link.

15. In a drive mechanism, as defined in claim 14 wherein the openings in the flywheel plate are circumferentially spaced and elongate and said links are disposed adjacent said elongate openings in said flywheel plate and each adjacent link and opening extend parallel to each other and said opening is of greater width than said link to permit flexing movement of portions of said link into said opening during movement of said plates to accommodate axial misalignment of said plates.

16. In a drive mechanism, rotatable first and second plates, said first plate having elongate openings therein; securing means on said second plate extending into said openings and spaced from the margins of said openings; and flexible flat drive links between said plates and each links being connected at one end to said first plate and at its other end to the securing means on said second plate, said links being disposed adjacent said elongate openings in said first plate and each adjacent link and opening extending parallel to each other and said opening having a greater width than said link to permit flexing movement of portions of said link into said opening during relative axial movement of said plates.

17. In a drive mechanism as defined in claim 16 wherein said links and openings are arranged chordally of a circumference of an axis of rotation of one of said plates and each link is connected to said securing means and said first plate on the major axis of the link.

18. In a drive mechanism, a flywheel plate having circumferentially spaced elongate openings therein; a hydrodynamic coupling device having a fluid-containing housing including a drive plate disposed adjacent said flywheel plate; securing means on said drive plate and extending into said openings and spaced from the margins of said openings; and flexible drive links between said plates, each link having one end thereof connected to said flywheel plate and its other end to the securing means on said drive plate, said links and elongate openings in said flywheel plate being arranged chordally of a circumference of the axis of rotation of said flywheel plate and said openings being of greater width than said links to permit flexing movement of portions of said links into said openings during relative axial movement of said plates.

19. In a drive mechanism as defined in claim 18 wherein the connections of each link to said securing means and to said flywheel plate are on the major axis of the link.

20. In a drive mechanism, spaced drive and driven members, each member having an axis of rotation and extending radially thereof; said drive member having elongate openings therein; securing means on said driven member extending into said openings and spaced from the margins of said openings; and flexible drive links between said members, each link having its ends connected to the securing means on said driven member, and an intermediate portion connected to said driven member, said links being disposed adjacent said elongate openings in said first member and each adjacent link and opening extending parallel to each other and said opening having a greater width than said link to permit flexing movement of portions of said link into said opening during movement of said members to accommodate axial misalignment of said members.

21. In a drive mechanism, rotatable drive and driven plates, said drive plate having elongate openings therein; securing means on said driven plate extending into said openings and spaced from the margins of said openings; and flexible drive links between said plates and each link having its ends connected to the securing means on said driven plate, and an intermediate portion connected to said drive plate, said links being disposed adjacent said elongate openings in said driven plate, and each adjacent link and opening extending parallel to each other and said opening having a greater width than said link to permit flexing movement of portions of said link into said opening, said links and openings being arranged chordally of a circumference of the axis of rotation of said drive plate and each link being connected to said securing means and said drive plate on the major axis of the link.

22. In a drive mechanism, a flywheel plate having circumferentially spaced elongate openings therein; a hydrodynamic coupling device having a fluid-containing housing including a drive plate disposed adjacent said flywheel plate; securing means on said drive plate and extending into said openings and spaced from the margins of said openings; and flexible drive links between said plates, each link having its ends connected to said securing means on said drive plate, and an intermediate portion connected to said flywheel plate, said links and elongate openings in said flywheel plate being arranged chordally of a circumference of the axis of rotation of said flywheel plate, and said openings being of greater width than said links to permit flexing movement of portions of said links into said openings during movement of said plates to accommodate axial misalignment of said plates, said connections of each link to said securing means and said flywheel plate being on the major axis of the link.

23. In a drive mechanism, a flywheel plate having circumferentially spaced elongate openings therein; a hydrodynamic coupling device having a fluid-containing housing including a drive plate disposed adjacent said flywheel plate; a plurality of arcuate mounting elements arranged on a circumference of the axis of rotation of the drive plate, each element having a radially extending portion welded at its inner edge to said drive plate and a channel-shaped portion disposed radially outwardly of said radially extending portion and with the bottom wall of the channel-shaped portion disposed along said flywheel plate and with its circumferentially spaced ends adjacent two of the elongate openings in said flywheel plate; a plurality of bolts extending through said spaced ends of said mounting members and into said openings and spaced from the margins of said openings; and flexible drive links between said plates, each link being connected to portions of said flywheel plate between the openings therein and having apertures at opposite ends thereof receiving said bolts; nuts securing said links to said bolts, said links being disposed adjacent said elongate openings in said flywheel plate and each adjacent link and opening extending parallel to each other and chordally to a circumference of the axis of rotation of the flywheel plate and said opening being of greater width than said link to permit flexing movement of portions of said link into said opening during movement of said plates to accommodate axial misalignment of said plates, each link being connected to said flywheel plate and said bolts on the major axis of the link.

References Cited in the file of this patent

UNITED STATES PATENTS

| 1,893,593 | Oechsle | Jan. 10, 1933 |
| 2,588,668 | Syrovy | Mar. 11, 1952 |

FOREIGN PATENTS

| 905,845 | France | Apr. 30, 1945 |

UNITED STATES PATENT OFFICE
CERTIFICATE OF CORRECTION

Patent No. 2,858,681 November 4, 1958

Richard L. Smirl et al.

It is hereby certified that error appears in the printed specification of the above numbered patent requiring correction and that the said Letters Patent should read as corrected below.

Column 6, lines 23 and 24, strike out "to permit flexing movement of portions of said link"; line 51, and column 7, line 22, for "flexible", each occurrence, read -- flexing --; same column 7, line 66, for "link" read -- links --; column 8, line 26, for "links" read -- link --.

Signed and sealed this 7th day of April 1959.

SEAL)
Attest:

KARL H. AXLINE
Attesting Officer

ROBERT C. WATSON
Commissioner of Patents